United States Patent [19]

Sioui et al.

[11] 4,042,346
[45] Aug. 16, 1977

[54] DIAMOND OR CUBIC BORON NITRIDE GRINDING WHEEL WITH RESIN CORE

[75] Inventors: Richard H. Sioui, Holden; Edgar B. Carver, South Sutton, both of Mass.

[73] Assignee: Norton Company, Worcester, Mass.

[21] Appl. No.: 644,161

[22] Filed: Dec. 24, 1975

[51] Int. Cl.$^2$ .............................................. C09K 3/14
[52] U.S. Cl. .............................. 51/298 A; 51/309 R
[58] Field of Search ................. 51/293, 295, 297, 298, 51/309

[56] References Cited

U.S. PATENT DOCUMENTS

| 3,385,684 | 5/1968 | Voter | 51/298 |
| 3,471,276 | 10/1969 | Bragaw | 51/298 |
| 3,664,819 | 5/1972 | Siqui et al. | 51/298 |
| 3,779,727 | 12/1973 | Siqui et al. | 51/298 |
| 3,868,233 | 2/1975 | Carver et al. | 51/298 |
| 3,899,307 | 8/1975 | Thompson | 51/298 |
| 3,925,035 | 12/1975 | Keat | 51/298 |

Primary Examiner—Donald J. Arnold
Attorney, Agent, or Firm—Rufus M. Franklin

[57] ABSTRACT

A diamond or cubic boron nitride grinding wheel in which an abrasive section comprising abrasive grits distributed through and held by a phenolic resin matrix is bonded to a non-abrasive core, is improved, in terms of ease of manufacture and elimination of cracking or poor adhesion, by means of a core composition which includes between 5 and 20% by volume of a thermoset resin selected from the group consisting of phenol aldehyde, urea formaldehyde, and melamine formaldehyde resins, particulate metal and graphite, and the remainder being a resin selected from the group consisting of epoxy resins, addition polymers of unsaturated polyesters, and thermosetting polyimide resins, in the range of from 5 to 80% by volume of the core.

3 Claims, 1 Drawing Figure

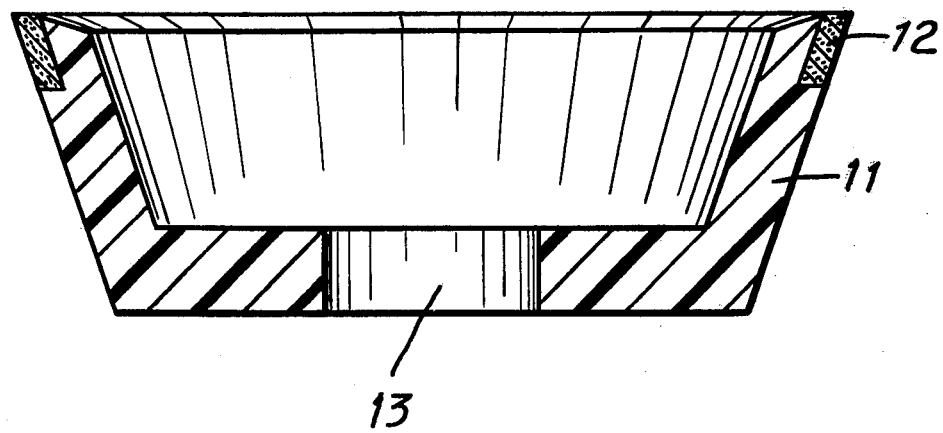

DIAMOND OR CUBIC BORON NITRIDE GRINDING WHEEL WITH RESIN CORE

BACKGROUND OF THE INVENTION

A common and conventional bond for resin bonded grinding wheels employing the premium abrasives diamond and cubic boron nitride is phenol formaldehyde resin, usually containing fillers to add strength and improve grinding performance. Such wheels are normally of a composite construction in which a rim of abrasive grits in the resin matrix is adhered to a central, non-abrasive core, the core being adapted to be mounted concentrically on a shaft for rotation of the wheel. It is desirable that the core have relatively high thermal conductivity, to conduct heat from the grinding section, and good adhesion to the grinding section. In certain shapes, such as "cup-wheels" in which the diamond section is a ring bonded to the outer periphery of the larger end of a frusto conical ring, as in the drawing, it is desirable for the user to be able to "dress" the tool by removing portions of the core adjacent the grinding section, to avoid rubbing of the core material against the work being ground.

All these factors are conventionally satisfied by the use of a core material of phenolic resin, filled with particulate aluminum or other metal, to give good heat conductivity and strength, and desireably with graphite or other solid lubricant powder to improve the machining (or "dressing") properties. The mix for forming the core usually also contains lime or some other particulate filler necessary to prevent cracking of the core during post cure.

In the manufacturing operation the core is cold pressed and then the abrasive ring is applied while the core and ring are confined in a hot pressing mold. After the hot pressing operation the wheel is subjected to a post cure. This method avoids cracking problems which arise if it is attempted to hot press the abrasive ring on a completely cured core.

Unfortunately, the above described method introduces problems leading to cracking of the core because of absorption of moisture and loss of dimensional stability of the cold pressed cores if they are not immediately used for making wheels.

The present invention solves the cracking problem by eliminating the need for lime, while retaining the good bonding properties of phenolic resin in the core. Although useful for straight wheels it is of particular utility in more complex shaped cup wheels as in the present drawing.

SUMMARY OF THE INVENTION

The present invention resides in the discovery that by eliminating lime from the mixture and substituting a second resin for a portion of the phenolic resin in the core, crack free products, with good adhesion of the rim to the core can be produced.

The phenolic resin, or an equivalent for the purposes of this invention which can be a urea formaldehyde resin or a melamine formaldehyde resin, must be present in an amount between 5 and 20%, by volume in the core, and the second resin makes up the balance of the volume not occupied by fillers, in the range of 5 to 35 volume %.

The second resin is a thermosetting molding resin that either evolves no volatiles upon curing or evolves them slowly during the post cure portion of the process. It also should be fully cured after completion of the post curing at 220° C for 24 hours which follows the hot pressing step at 165° C. Suitable resins which evolve no volatiles are those which cure by addition reactions such as epoxies, polyurethanes, and unsaturated polyesters. Resins which cure with slow evolution of volatiles are the thermosetting polyimide molding resins such as Kinel 1050 available from Rhone-Poulenc, Paris, France.

The metal filler may be aluminum or copper, present in an amount of from 40 to 70 volume %. Graphite in the amount of 0 to 25%, preferably 5 to 25% is desireable to improve dressability and green strength. Other solid lubricants such as hexagonal boron nitride, molybdenum sulfide, and polytetrafluoroethylene may be used. The metal filler may be eliminated if heat conductivity is not required in the particular wheel being made. In such case the upper limit of volume % for the second resin is 80%.

RELATED PRIOR ART

U.S. Pat. to Sacco No. 3,074,211, shows a straight wheel having a peripheral diamond section bonded on a core and teaches the use of a filled epoxy novolak resin, or other volatileless resin as the material for a core for diamond wheels. The core is at least partially cured and preferably fully cured prior to attaching the diamond section.

BRIEF DESCRIPTION OF THE DRAWING

The drawing shows a grinding wheel consisting of core 11, having grinding section 12, and a mounting hole 13 in the core.

SPECIFIC EMBODIMENT OF THE INVENTION

A preferred core composition according to the present invention, for manufacturing a grinding wheel as shown in the drawing is as follows:

|  | Vol. % | Wt. % |
| --- | --- | --- |
| Phenolic resin molding powder (Union Carbide 5980, a two stage novolak containing 9% hexamethylene tetramine) | 10 | 5.6 |
| Kinel 1050 polyimide molding powder | 15 | 8.6 |
| Aluminum powder | 60 | 71.3 |
| Flake graphite | 15 | 14.5 |

The above ingredients are thoroughly blended, placed in a suitable shaped mold and subjected to a pressure of from 10 to 20 tons per square inch to produce a preform of sufficient green strength for subsequent handling. When necessary, depending on the shape of the wheel, a suitable recess for the diamond section is then machined, as by turning on a lathe, into the cold pressed core.

The mixture of abrasive grits, resin, filler and any other abrasive section component powders is then placed in position on the pre-formed core and the core and grinding section subjected to a pressure of from 2 to 5 tons per square inch and a temperature of 165° C for about 30 minutes. The integral core and grinding section are then placed in an oven and cured for 24 hours at top temperature of 220° C.

The abrasive section is a phenolic resin bonded diamond or cubic boron nitride ring. The composition of the grinding section can be as disclosed in U.S. Pat. Nos. 3,868,232; 3,779,727; and 3,664,819, or may employ a more conventional bond consisting simply of silicon carbide filled phenolic resin.

What is claimed is:
1. In a grinding wheel comprising a grinding section including an abrasive selected from the group consisting of diamond and cubic boron nitride, said grinding section being bonded to the outer periphery of a non-abrasive core, the improvement comprising the core having a composition consisting essentially of from 5 to 20% by volume of a resin selected from the group consisting of phenol aldehyde, urea aldehyde, and melamine aldehyde resins, from 0 to 90% by volume of fillers selected from the group consisting of aluminum powder, copper powder, and graphite, and from 5 to 80% by volume of cured reaction products of resin molding powders selected from the group consisting of epoxy resins, unsaturated polyester resins, urethane resins, and thermosetting polyimide resins.

2. A cup type grinding wheel as in claim 1.
3. A cup type grinding wheel as in claim 1 in which the grinding section lies in a recess extending radially and axially of a cup shaped core.